US012662584B2

(12) United States Patent
Chou et al.

(10) Patent No.: US 12,662,584 B2
(45) Date of Patent: Jun. 23, 2026

(54) HEALABLE AND RECYCLABLE POLYIMIDE POLYMER RESIN, HEALING METHOD AND RECYCLING METHOD THEREOF

(71) Applicant: National Tsing Hua University, Hsinchu (TW)

(72) Inventors: Ho-Hsiu Chou, Hsinchu (TW); Kuei-Yi Chuang, Hsinchu City (TW)

(73) Assignee: National Tsing Hua University, Hsinchu (TW)

( * ) Notice: Subject to any disclaimer, the term of this patent is extended or adjusted under 35 U.S.C. 154(b) by 0 days.

(21) Appl. No.: 19/054,152

(22) Filed: Feb. 14, 2025

(65) Prior Publication Data

US 2025/0188243 A1 Jun. 12, 2025

Related U.S. Application Data

(62) Division of application No. 18/151,924, filed on Jan. 9, 2023, now Pat. No. 12,252,591.

(30) Foreign Application Priority Data

Jul. 13, 2022 (TW) ................................. 111126352

(51) Int. Cl.
*C08J 11/08* (2006.01)
*C08G 73/10* (2006.01)

(52) U.S. Cl.
CPC ........... *C08J 11/08* (2013.01); *C08G 73/1039* (2013.01); *C08G 73/1096* (2013.01); *C08J 2379/08* (2013.01)

(58) Field of Classification Search
CPC ... C08J 11/08; C08J 2379/08; C08G 73/1039; C08G 73/1096
See application file for complete search history.

(56) References Cited

U.S. PATENT DOCUMENTS

| | | | | |
|---|---|---|---|---|
| 9,708,437 | B2 * | 7/2017 | Chuang | C08J 5/249 |
| 10,626,219 | B2 * | 4/2020 | Chuang | H01B 3/40 |
| 2012/0052293 | A1 * | 3/2012 | Poe | C08G 73/1042 524/588 |
| 2021/0189057 | A1 | 6/2021 | Chuang et al. | |
| 2022/0372189 | A1 * | 11/2022 | Ting | C08F 236/04 |
| 2023/0203238 | A1 * | 6/2023 | Ting | C08G 59/245 523/414 |

FOREIGN PATENT DOCUMENTS

| | | | |
|---|---|---|---|
| CN | 105086378 | A | 11/2015 |
| CN | 114591535 | A | 6/2022 |
| TW | 202124550 | A | 7/2021 |

OTHER PUBLICATIONS

Matthews ("Synthesis, Characterization, and Properties of Fully Aliphatic Polyimides and Their Derivatives for Microelectronics and Optoelectronics Applications", Matthews et al, Macromolecular Research, vol. 15, No. 2, pp. 114-128 (2007)), (Year: 2007).*
Liu ("Self-healing polymers based on thermally reversible Diels-Alder chemistry", Liu et al, Polym. Chem 2013, 4, 2194) (Year: 2013).*
Zhou ("Synthesis and characterization of transparent polyimides derived from ester-containing dianhydrides with different electron affinities", Zhou et al, RSC Adv. 2015, 5, 79207), (Year: 2015).*
Kim ("Colorless polyimides with excellent optical transparency and self-healing properties based on multi-exchange dynamic network", Kim et al, Applied Materials Today 25 (2021) 101226) (Year: 2021).*
Kim et al., "Colorless polyimides with excellent optical transparency and self-healing properties based on multi-exchange dynamic network", Applied Materials Today, 2021, vol. 25, Article 101226.
Liu et al., "Self-healing polymers based on thermally reversible Diels-Alder chemistry", Polymer Chemistry, 2013, pp. 2194-2205, vol. 4.
Matthews et al., "Synthesis, characterization, and properties of fully aliphatic polyimides and their derivatives for microelectronics and optoelectronics applications", Macromolecular Research, 2007, pp. 114-128, vol. 15.
Zhou et al., "Synthesis and characterization of transparent polyimides derived from ester-containing dianhydrides with different electron affinities", RSC Advances, 2015, pp. 79207-79215, vol. 5, Issue 96.

* cited by examiner

*Primary Examiner* — Michael G Miller
(74) *Attorney, Agent, or Firm* — The Webb Law Firm

(57) ABSTRACT

A healable and recyclable polyimide polymer resin includes a chemical structural unit represented by formula (I), which is defined in the description. The chemical structural unit represented by the formula (I) bonds to at least one condensation-polymerizable monomer, so as to form the healable and recyclable polyimide polymer resin, and the condensation-polymerizable monomer is a diamine monomer or a dianhydride monomer.

7 Claims, No Drawings

HEALABLE AND RECYCLABLE POLYIMIDE POLYMER RESIN, HEALING METHOD AND RECYCLING METHOD THEREOF

CROSS-REFERENCE TO RELATED APPLICATIONS

This application is a divisional patent application of U.S. patent application Ser. No. 18/151,924, filed on Jan. 9, 2023, which claims priority to Taiwanese Patent Application No. 111126352, filed Jul. 13, 2022, the entire disclosures of each of which are hereby incorporated by reference in their entirety.

BACKGROUND OF THE INVENTION

Field of the Invention

The present disclosure relates to a polyimide polymer resin, a healing method and a recycling method thereof. More particularly, the present disclosure relates to a polyimide polymer resin which has the properties such as rigidity, chemical resistance, heat resistance, healability and recyclability, which can be applied to the electronic products such as mobile phones, tablets and wearable devices, and which can be healed and recycled by a method of controlling temperature.

Description of Related Art

Thermosetting resin polymer can be applied to various fields. However, when the products made of the conventional thermosetting resin polymer is broken or the life cycle thereof is over, the products cannot be repaired but discarded, which is a waste of resources. Moreover, because the discarded thermosetting resin polymer is hard to be degraded naturally, the discarded polymer can be treated only by burial or burning nowadays, which leads to severe environmental pollution.

Although there have already been related researches about healable or recyclable polyimide (PI) resin, but the commercial applications thereof are limited because the heat-resistibility and chemical-resistibility of the aforementioned polyimide resin are relatively poor.

In this regard, it is a goal with commercial value to develop a polyimide polymer resin which is rigid, chemical-resistant, heat-resistant, healable and recyclable and to develop a healing method and a recycling method thereof.

SUMMARY OF THE INVENTION

According to the present disclosure, a healable and recyclable polyimide polymer resin includes a chemical structural unit represented by formula (I):

formula (I)

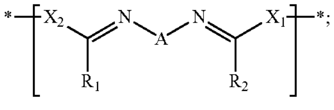

wherein in the formula (I), A is single bond, benzene, biphenyl, benzophenone or 3,3'-bis(trifluoromethyl)-4,4'-dimethylbiphenyl, each of $R_1$ and $R_2$ is methyl, ethyl or trifluoromethyl independently, $X_1$ is diphenyl ether, biphenyl, benzophenone, 2,2-diphenyl propane, (−)-di-p-toluenesulfonyl, or 3,3'-bis(trifluoromethyl)-4,4'-dimethylbiphenyl, $X_2$ is a group represented by formula (IA):

formula (IA)

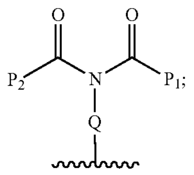

wherein in the formula (IA), Q is benzene, hexafluoro-2,2-diphenylmethane, biphenyl, benzophenone, diphenyl ether or alicyclic structure, each of $P_1$ and $P_2$ is benzene, biphenyl, hexafluoro-2,2-diphenylmethane or alicyclic structure independently, and $P_1$ and $P_2$ are connected to or disconnected from each other; wherein the chemical structural unit represented by the formula (I) bonds to at least one condensation-polymerizable monomer, so as to form the healable and recyclable polyimide polymer resin, and the condensation-polymerizable monomer is a diamine monomer or a dianhydride monomer.

According to the present disclosure, a healing method of the aforementioned healable and recyclable polyimide polymer resin is provided. The healable and recyclable polyimide polymer resin is healed by a healing process under a healing temperature.

According to the present disclosure, a recycling method of the aforementioned healable and recyclable polyimide polymer resin includes the steps as follows: a dissolving process is performed and a film-forming process is performed. In the dissolving process, the healable and recyclable polyimide polymer resin is dissolved in a solution of diethylenetriamine, so as to obtain a recycled polyimide solution. In the film-forming process, the recycled polyimide solution is coated and baked, so as to form a recycled polyimide film.

DESCRIPTION OF THE INVENTION

The present disclosure will be further exemplified by the following specific embodiments. However, the embodiments can be applied to various inventive concepts and can be embodied in various specific ranges. The specific embodiments are only for the purposes of description, and are not limited to these practical details thereof.

In the present disclosure, the compound structure can be represented by a skeleton formula, and this representation can omit carbon atoms, hydrogen atoms and carbon-hydrogen bonds. If the functional groups are clearly identified in a structural formula, the identified structural formula should be followed.

In the present disclosure, in order to keep conciseness and smoothness, "the compound including a structure represented by formula (II)" can be described as a compound represented by formula (II) in some cases, and the other compounds or groups can be described in the same manner.

According to the present disclosure, a healable and recyclable polyimide polymer resin includes a chemical structural unit represented by formula (I):

formula (I)

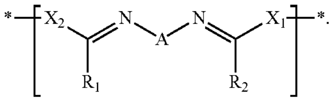

In the formula (I), A is single bond, benzene, biphenyl, benzophenone or 3,3'-bis(trifluoromethyl)-4,4'-dimethylbiphenyl, each of $R_1$ and $R_2$ is methyl, ethyl or trifluoromethyl independently, $X_1$ is diphenyl ether, biphenyl, benzophenone, 2,2-diphenyl propane, (-)-di-p-toluenesulfonyl, or 3,3'-bis(trifluoromethyl)-4,4'-dimethylbiphenyl, $X_2$ is a group represented by formula (IA):

formula (IA)

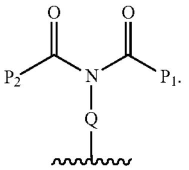

In the formula (IA), Q is benzene, hexafluoro-2,2-diphenylmethane, biphenyl, benzophenone, diphenyl ether or alicyclic structure, each of $P_1$ and $P_2$ is benzene, biphenyl, hexafluoro-2,2-diphenylmethane or alicyclic structure independently, and $P_1$ and $P_2$ are connected to or disconnected from each other; wherein the chemical structural unit represented by the formula (I) bonds to at least one condensation-polymerizable monomer, so as to form the healable and recyclable polyimide polymer resin, and the condensation-polymerizable monomer is a diamine monomer or a dianhydride monomer. Therefore, by changing the types of diamines, the healable and recyclable polyimide polymer resin of the present disclosure can have the properties of rigidity, chemical resistance, healability and recyclability, and have great heat-stability.

The healable and recyclable polyimide polymer resin of the present disclosure includes the chemical structural unit represented by the formula (I). The aforementioned chemical structural unit is a healable structural unit, which is favorable for the polyimide polymer resin films being healed and recycled, and ensures that the polyimide polymer resin has great heat resistance and mechanical properties.

The chemical structural unit represented by the formula (I) can include a structure represented by formula (I-1), formula (I-2), formula (I-3), formula (I-4), formula (I-5), formula (I-6), formula (I-7) or formula (I-8):

formula (I-1)

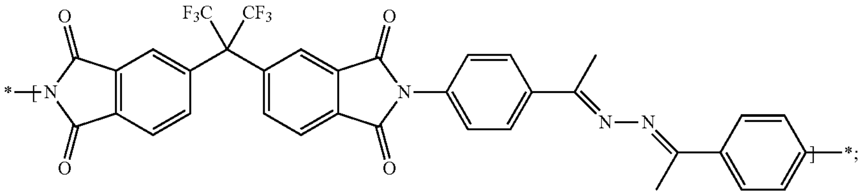

formula (I-2)

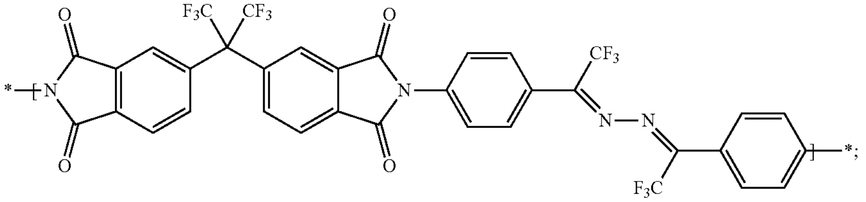

formula (I-3)

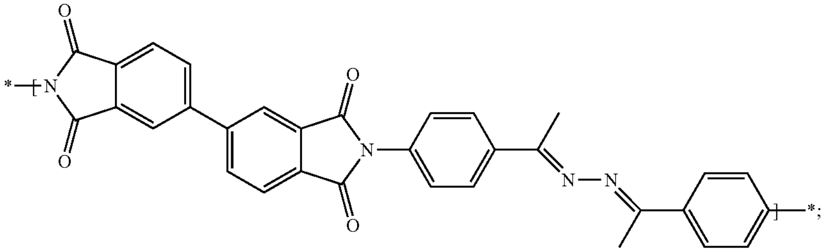

formula (I-4)

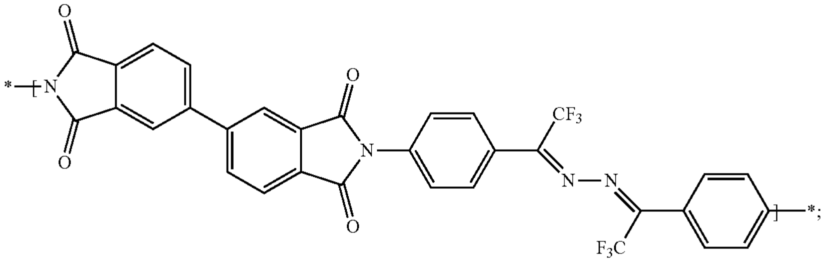

-continued formula (I-5)

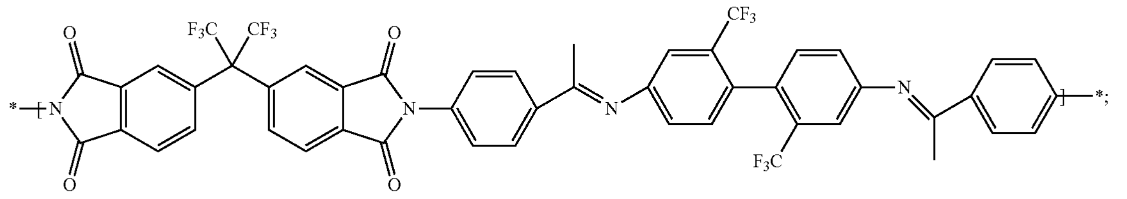

formula (I-6)

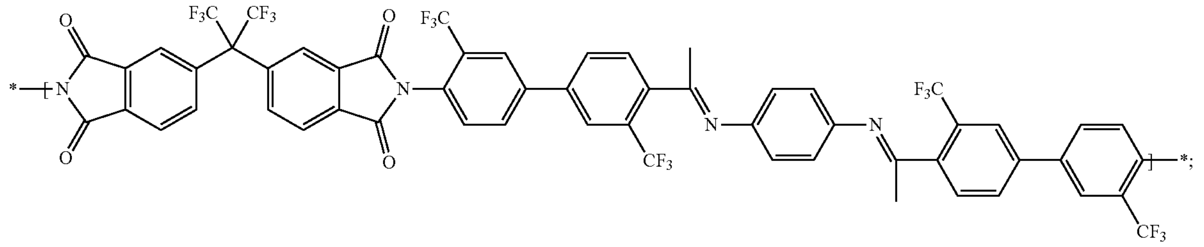

formula (I-7)

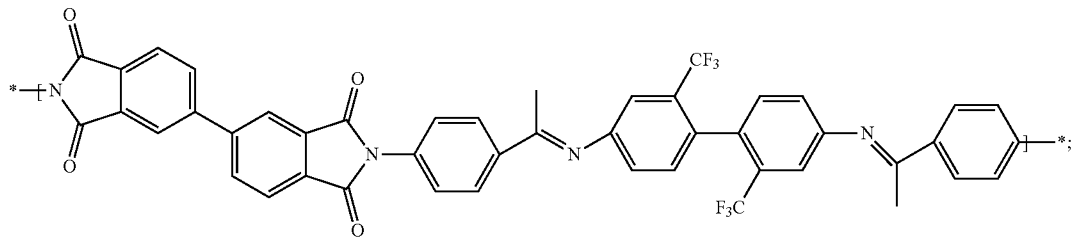

formula (I-8)

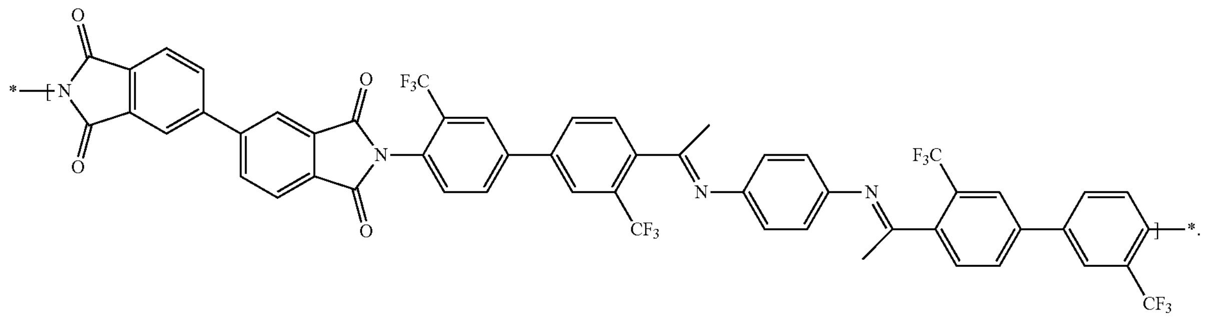

In particular, the coefficient of thermal expansion (CTE) of the healable and recyclable polyimide polymer resin of the present disclosure can be 10 ppm/° C. to 70 ppm/° C. The glass transition temperature ($T_g$) of the healable and recyclable polyimide polymer resin of the present disclosure can be 170° C. to 380° C.

The healable and recyclable polyimide polymer resin of the present disclosure can further include a compound, wherein the chemical structural unit represented by the formula (I) is further mixed with the compound and a polymerization is conducted by heating, and the compound includes a structure represented by formula (II):

formula (II)

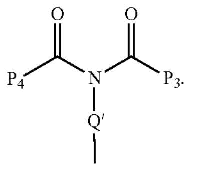

In the formula (II), Q' can be benzene, hexafluoro-2,2-diphenylmethane, biphenyl, benzophenone, diphenyl ether or alicyclic structure, each of $P_3$ and $P_4$ can be benzene, biphenyl, hexafluoro-2,2-diphenylmethane or alicyclic structure independently, and $P_3$ and $P_4$ can be connected to or disconnected from each other.

In particular, because the compound represented by the formula (II) includes higher proportion of aromatic rings or alicyclic structures, the healable and recyclable polyimide polymer resin synthesized from the chemical structural unit represented by the formula (I) and the compound represented by the formula (II) can perform better chemical-resistibility and heat-resistibility and have wider applications than the healable and recyclable polyimide polymer resin only synthesized from the chemical structural unit represented by the formula (I).

The chemical structural unit represented by the formula (I) and the compound represented by the formula (II) can be mixed in a range of mole fraction. The aforementioned range of mole fraction can be 0.1:99.9 to 99.9:0.1. Furthermore, the aforementioned range of mole fraction can be 1:99 to 99:1, so as to obtain a better healing property. Furthermore, the aforementioned range of mole fraction can be 1:99 to 40:60, so as to obtain a better heat-resistibility.

In detail, in the step of synthesizing the healable and recyclable polyimide polymer resin of the present disclosure, the chemical structural unit represented by the formula (I) and the compound represented by the formula (II) are already mixed with each other.

According to the present disclosure, a healing method of the aforementioned healable and recyclable polyimide polymer resin is provided. The healable and recyclable polyimide polymer resin is healed by a healing process under a healing temperature. In detail, the healing temperature can be 80° C. to 150° C., and the healing process can be a heating healing process or a compressing healing process.

According to the present disclosure, a recycling method of the aforementioned healable and recyclable polyimide polymer resin includes the steps as follows: a dissolving process is performed and a film-forming process is performed. In the dissolving process, the healable and recyclable polyimide polymer resin is dissolved in a solution of diethylenetriamine (DETA), so as to obtain a recycled polyimide solution. In the film-forming process, the recycled polyimide solution is coated and baked, so as to form a recycled polyimide film.

In detail, in the dissolving process, the healable and recyclable polyimide polymer resin can be cut into chips which are smaller than 1 $cm^2$ and soaked in the solution of diethylenetriamine. The solvent of the solution of diethylenetriamine can be dimethylacetamide (DMAc). A percentage by volume of diethylenetriamine in the solution of diethylenetriamine can be 1% to 10%. A solid content of the recycled polyimide solution can be 10% to 20%.

Moreover, the healable and recyclable polyimide polymer resin can be dissolved in the solution of diethylenetriamine under 25° C. to 80° C. In particular, it takes about one week for the healable and recyclable polyimide polymer resin to be fully dissolved under the room temperature (about 25° C.), and it only takes less than 48 hours to dissolve when the temperature is 80° C. The recycled polyimide film formed by the recycling method of the healable and recyclable polyimide polymer resin of the present disclosure can maintain great mechanical properties.

Synthesis Method of Healable and Recyclable Polyimide Polymer Resin 1-1. Example 1, Example 2 and Example 3: The healable and recyclable polyimide polymer resin is obtained by mixing the structure represented by the formula (I-1), the structure represented by the formula (I-3) and the compound represented by the formula (II).

2,2'-Bis(trifluoromethyl) benzidine (TFMB) and a compound represented by formula (AZ) are put into a flask, and N-methyl-2-pyrrolidone (NMP) is added therein as a solvent. 4,4'-(Hexafluoroisopropylidene) diphthalic anhydride (6-FDA) and biphenyl-tetracarboxylic acid dianhydride (BPDA) are added after the aforementioned reactants are dissolved. The solution is stirred under room temperature for 12 hours to 18 hours, and the healable and recyclable polyimide polymer resin of Example 1, Example 2 and Example 3 can be obtained. In detail, the compound represented by the formula (AZ) is synthesized by 4-aminoacetophenone, triethylamine and hydrazine sulfate reacting in ethanol. The structures of the aforementioned TFMB, the compound represented by the formula (AZ), 6-FDA and BPDA are shown as follows:

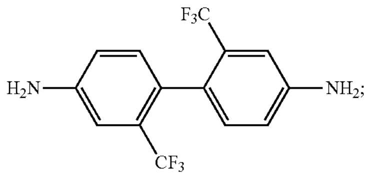

TFMB formula (AZ)

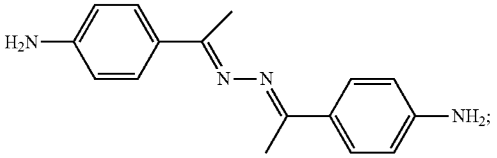

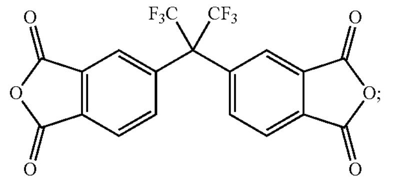

6-FDA

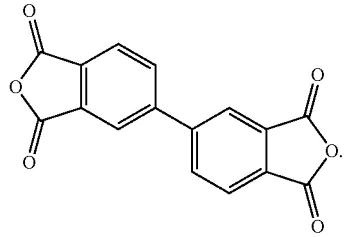

BPDA

The respective mole fractions of TFMB, the compound represented by the formula (AZ), 6-FDA and BPDA for synthesizing Example 1, Example 2 and Example 3 are shown in Table 1 below.

TABLE 1

| | | Example 1 | Example 2 | Example 3 |
|---|---|---|---|---|
| Mole Fraction of Diamine Material | TFMB | 0.95 | 0.9 | 0.6 |
| | Compound Represented by Formula (AZ) | 0.05 | 0.1 | 0.4 |

TABLE 1-continued

| | | Example 1 | Example 2 | Example 3 |
|---|---|---|---|---|
| Mole Fraction of Dianhydride Material | 6-FDA | 0.05 | 0.05 | 0.95 |
| | BPDA | 0.95 | 0.95 | 0.05 |

In detail, TFMB respectively reacts with 6-FDA and BPDA to form the compound represented by the formula (II), and the compound represented by the formula (AZ) respectively reacts with 6-FDA and BPDA to form the structure represented by the formula (I-1) and the structure represented by the formula (I-3). The range of mole fraction of the chemical structural unit represented by the formula (I) and the compound represented by the formula (II) can be 0.1:99.9 to 99.9:0.1.

1-2. Example 4, Example 5 and Example 6: The healable and recyclable polyimide polymer resin is obtained by mixing the structure represented by the formula (I-2), the structure represented by the formula (I-4) and the compound represented by the formula (II).

TFMB and a compound represented by formula (AFZ) are put into a flask, and NMP is added therein as a solvent. BPDA and 6-FDA are added after the aforementioned reactants are dissolved. The solution is stirred under room temperature for 12 hours to 18 hours, and the healable and recyclable polyimide polymer resin of Example 4, Example 5 and Example 6 can be obtained. In detail, the compound represented by the formula (AFZ) is synthesized by (4-aminophenyl)-2,2,2-trifluoro-1-ethanone, triethylamine and hydrazine sulfate reacting in ethanol, and the structure thereof is shown as follow:

formula (AFZ)

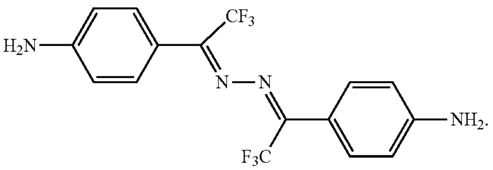

The respective mole fractions of TFMB, the compound represented by the formula (AFZ), 6-FDA and BPDA for synthesizing Example 4, Example 5 and Example 6 are shown in Table 2 below.

TABLE 2

| | | Example 4 | Example 5 | Example 6 |
|---|---|---|---|---|
| Mole Fraction of Diamine Material | TFMB | 0.95 | 0.9 | 0.6 |
| | Compound Represented by Formula (AFZ) | 0.05 | 0.1 | 0.4 |
| Mole Fraction of Dianhydride Material | 6-FDA | 0.05 | 0.05 | 0.05 |
| | BPDA | 0.95 | 0.95 | 0.95 |

In detail, TFMB respectively reacts with 6-FDA and BPDA to form the compound represented by the formula (II) by a condensation polymerization, and the compound represented by the formula (AFZ) respectively reacts with 6-FDA and BPDA to form the structure represented by the formula (I-2) and the structure represented by the formula (I-4). The range of mole fraction of the chemical structural unit represented by the formula (I) and the compound represented by the formula (II) can be 0.1:99.9 to 99.9:0.1.

1-3. Example 7, Example 8 and Example 9: The healable and recyclable polyimide polymer resin is obtained by mixing the structure represented by the formula (I-5), the structure represented by the formula (I-7) and the compound represented by the formula (II).

TFMB and a compound represented by formula (IFZ-1) are put into a flask, and NMP is added therein as a solvent. BPDA and 6-FDA are added after the aforementioned reactants are dissolved. The solution is stirred under room temperature for 12 hours to 18 hours, and the healable and recyclable polyimide polymer resin of Example 7, Example 8 and Example 9 can be obtained. In detail, the compound represented by the formula (IFZ-1) is synthesized by 4-aminobenzaldehyde and 2,2'-bis(trifluoromethyl) benzidine reacting in tetrahydrofuran (THF), and the structure thereof is shown as follow:

formula (IFZ-1)

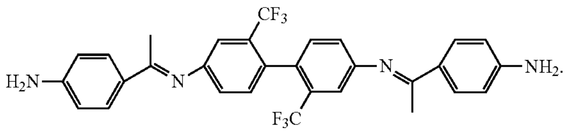

The respective mole fractions of TFMB, the compound represented by the formula (IFZ-1), 6-FDA and BPDA for synthesizing Example 7, Example 8 and Example 9 are shown in Table 3 below.

TABLE 3

| | | Example 7 | Example 8 | Example 9 |
|---|---|---|---|---|
| Mole Fraction of Diamine Material | TFMB | 0.95 | 0.9 | 0.6 |
| | Compound Represented by Formula (IFZ-1) | 0.05 | 0.1 | 0.4 |
| Mole Fraction of Dianhydride Material | 6-FDA | 0.05 | 0.05 | 0.05 |
| | BPDA | 0.95 | 0.95 | 0.95 |

In detail, TFMB respectively reacts with 6-FDA and BPDA to form the compound represented by the formula (II), and the compound represented by the formula (IFZ-1) respectively reacts with 6-FDA and BPDA to form the structure represented by the formula (I-5) and the structure represented by the formula (I-7). The range of mole fraction of the chemical structural unit represented by the formula (I) and the compound represented by the formula (II) can be 0.1:99.9 to 99.9:0.1.

1-4. Example 10, Example 11 and Example 12: The healable and recyclable polyimide polymer resin is obtained by mixing the structure represented by the formula (I-6), the structure represented by the formula (I-8) and the compound represented by the formula (II).

TFMB and a compound represented by formula (IFZ-2) are put into a flask, and NMP is added therein as a solvent. BPDA and 6-FDA are added after the aforementioned reactants are dissolved. The solution is stirred under room temperature for 12 hours to 18 hours, and the healable and recyclable polyimide polymer resin of Example 10, Example 11 and Example 12 can be obtained. In detail, the compound represented by the formula (IFZ-2) is synthesized by 1,4-diacetylbenzene and 2,2'-bis(trifluoromethyl) benzidine reacting in tetrahydrofuran, and the structure thereof is shown as follow:

formula (IFZ-2)

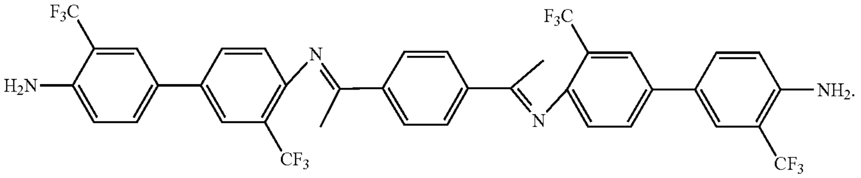

The respective mole fractions of TFMB, the compound represented by the formula (IFZ-2), 6-FDA and BPDA for synthesizing Example 10, Example 11 and Example 12 are shown in Table 4 below.

TABLE 4

| | | Example 10 | Example 11 | Example 12 |
|---|---|---|---|---|
| Mole Fraction of Diamine Material | TFMB | 0.95 | 0.9 | 0.6 |
| | Compound Represented by Formula (IFZ-2) | 0.05 | 0.1 | 0.4 |
| Mole Fraction of Dianhydride Material | 6-FDA | 0.05 | 0.05 | 0.05 |
| | BPDA | 0.95 | 0.95 | 0.95 |

In detail, TFMB respectively reacts with 6-FDA and BPDA to form the compound represented by the formula (II) by a condensation polymerization, and the compound represented by the formula (IFZ-2) respectively reacts with 6-FDA and BPDA to form the structure represented by the formula (I-6) and the structure represented by the formula (I-8). The range of mole fraction of the chemical structural unit represented by the formula (I) and the compound represented by the formula (II) can be 0.1:99.9 to 99.9:0.1.

In other examples, BPDA or 6-FDA can be replaced by other compounds to perform the aforementioned reactions, so as to obtain the healable and recyclable polyimide polymer resin with different properties. For example, the other compounds can be compounds represented by formula (A), formula (B), formula (C), formula (D), formula (E), formula (F) and formula (G) as shown in Table 5 below, or can be compounds represented by formula (H), formula (J), formula (K), formula (L), formula (M), formula (N), formula (O) and formula (P) as shown in Table 6 below. However, the present disclosure is not limited thereto.

As shown in Table 5 below, the compound represented by the formula (A) is 1,2,4,5-cyclohexanetetracarboxylic dianhydride, the compound represented by the formula (B) is 3,3',4,4'-benzophenonetetracarboxylic dianhydride, the compound represented by the formula (C) is pyromellitic dianhydride, the compound represented by the formula (D) is 4,4'-oxydiphthalic anhydride, the compound represented by the formula (E) is bicyclo [2.2.2]octane-2,3,5,6-tetracarboxylic 2,3,5,6-dianhydride, the compound represented by the formula (F) is dicyclohexyl-3,4,3 ',4'-tetracarboxylic dianhydride, the compound represented by the formula (G) is 1,2,3,4-cyclobutanetetracarboxylic dianhydride.

TABLE 5

| | |
|---|---|
| 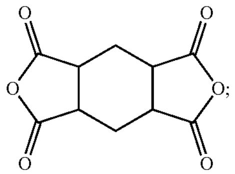 [SMILES: O=C1OC(=O)C2CC3C(=O)OC(=O)C3CC12] | formula (A) |
| 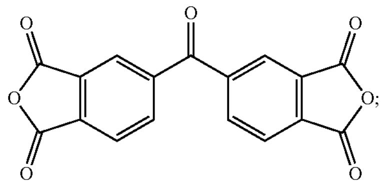 [SMILES: O=C(c1ccc2c(c1)C(=O)OC2=O)c1ccc2c(c1)C(=O)OC2=O] | formula (B) |
| 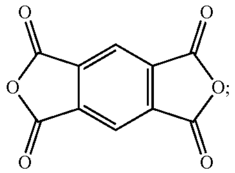 [SMILES: O=c1oc(=O)c2cc3c(=O)oc(=O)c3cc12] | formula (C) |
| 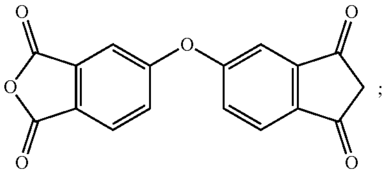 [SMILES: O=C1CC(=O)c2cc(Oc3ccc4c(c3)C(=O)OC4=O)ccc21] | formula (D) |
| 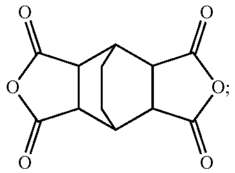 [SMILES: O=C1OC(=O)C2C3CCC(C12)C1C(=O)OC(=O)C31] | formula (E) |
| 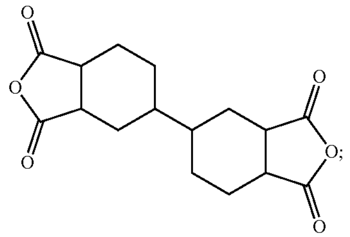 [SMILES: O=C1OC(=O)C2CC(C3CCC4C(=O)OC(=O)C4C3)CCC12] | formula (F) |
| 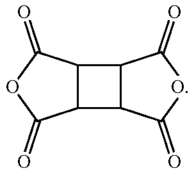 [SMILES: O=C1OC(=O)C2C1C1C(=O)OC(=O)C21] | formula (G) |

As shown in Table 6 below, the compound represented by the formula (H) is 4,4'-diaminodiphenyl oxide (ODA), the compound represented by the formula (J) is 1,4-cyclohexanediamine, the compound represented by the formula (K) is bis(aminomethyl)norbornane, the compound represented by the formula (L) is 4,4'-methylenebis(2-methylcyclohexylamine), the compound represented by the formula (M) is 4,4'-methylenebis(cyclohexylamine), the compound represented by the formula (N) is 2,2-bis(4-aminophenyl) hexafluoropropane, the compound represented by the formula (O) is 2,2'-bis(trifluoromethyl)benzidine, the compound represented by the formula (P) is 4,4'-bis(4-aminophenoxy)biphenyl.

TABLE 6

| | |
|---|---|
| 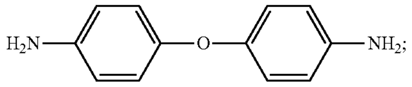 [SMILES: Nc1ccc(Oc2ccc(N)cc2)cc1] | formula (H) |
| 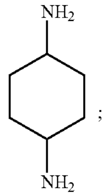 | formula (J) |
| 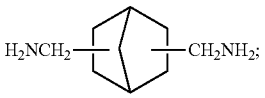 | formula (K) |
| 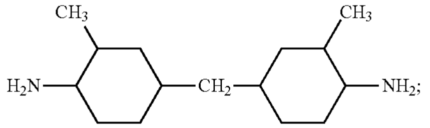 [SMILES: CC1CC(CC2CCC(N)C(C)C2)CCC1N] | formula (L) |
| 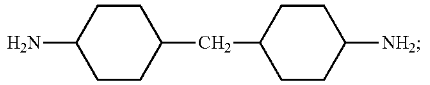 | formula (M) |
| 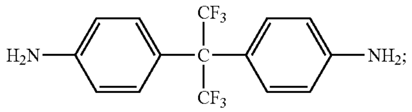 | formula (N) |
| 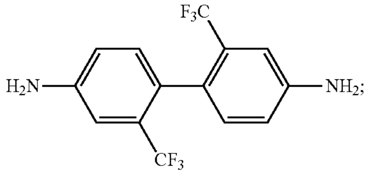 [SMILES: Nc1ccc(-c2ccc(N)cc2C(F)(F)F)c(C(F)(F)F)c1] | formula (O) |
| 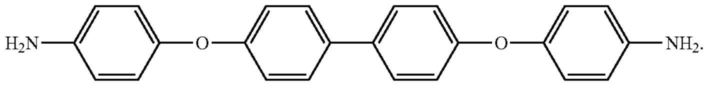 | formula (P) |

Overall, the chemical structure of every example includes large quantity of aromatic rings, so it can be determined that the healable and recyclable polyimide polymer resin of the present disclosure has great chemical-resistibility.

Properties and Healing Method of Healable and Recyclable Polyimide Polymer Resin A healing test of the healable and recyclable polyimide polymer resin of each example will be performed, so as to understand the properties and the healing effect of the healable and recyclable polyimide polymer resin of each example.

In particular, in the aforementioned healing test, the healable and recyclable polyimide polymer resin of each example is made into a thin film and tested for CTE, $T_g$, and tensile strength. After the tests are finished, the aforementioned thin film is cut in half. The two cut films are stacked and heated in an environment of 80° C. to 150° C. for healing. When the healing is finished, the tensile strength of the healed film is tested to compare the tensile strength values before the thin film is cut and after healed, so as to calculate the recovery ratio.

In detail, the healable and recyclable polyimide polymer resin of each example is coated on glass and put into the oven of 200° C. to 240° C. to react for 2 hours to 4 hours, and the aforementioned thin film is obtained after cooling and demolding. $T_g$, CTE and tensile strength of each thin film and each healed film are all measured by thermal mechanical analyzer (TMA), which follows the test method of IPC-TM-650 2.4.24.5. The coefficient of thermal expansion and the glass transition temperature of the thin film of each example are listed in Table 7 below. The tensile strength before the thin film being cut and the tensile strength after healed of each example are listed in Table 8 below.

TABLE 7

| | Example 1 | Example 2 | Example 3 | Example 4 | Example 5 | Example 6 |
|---|---|---|---|---|---|---|
| CTE (ppm/° C.) | 20 | 24 | 43 | 21 | 32 | 48 |
| $T_g$ (° C.) | 297 | 293 | 258 | 301 | 281 | 255 |
| | Example 7 | Example 8 | Example 9 | Example 10 | Example 11 | Example 12 |
| CTE (ppm/° C.) | 18 | 32 | 41 | 47 | 51 | 62 |
| $T_g$ (° C.) | 322 | 308 | 235 | 289 | 281 | 241 |

TABLE 8

| | Before Cut | After Healed | Before Cut | After Healed | Before Cut | After Healed | Before Cut | After Healed |
|---|---|---|---|---|---|---|---|---|
| | Example 1 | | Example 3 | | Example 4 | | Example 6 | |
| Tensile Strength (MPa) | 150 | 148 | 127 | 119 | 112 | 104 | 108 | 97 |
| Recovery Ratio | 98% | | 93% | | 95% | | 89% | |
| | Example 7 | | Example 9 | | Example 10 | | Example 12 | |
| Tensile Strength (MPa) | 85 | 73 | 70 | 61 | 62 | 54 | 51 | 45 |
| Recovery Ratio | 86% | | 87% | | 87% | | 88% | |

In Table 7, CTE of the thin film made of the healable and recyclable polyimide polymer resin of each example is 18 ppm/° C. to 62 ppm/° C. The wide CTE range represents that the healable and recyclable polyimide polymer resin of the present disclosure can be applied to various elements with different CTE requirements. $T_g$ of the thin film made of the healable and recyclable polyimide polymer resin of each example is 235° C. to 322° C., which represents that the hardness of the healable and recyclable polyimide polymer resin of the aforementioned examples may change only if the temperature is over 235° C. In other examples, CTE of the thin film made of the healable and recyclable polyimide polymer resin can be 10 ppm/° C. to 70 ppm/° C., and $T_g$ thereof can be 170° C. to 380° C. Therefore, it shows that the healable and recyclable polyimide polymer resin of the present disclosure has rigid property and great heat- resistibility.

In particular, the healable and recyclable polyimide polymer resin of the present disclosure includes imine functional groups, and the bonding strength of the imine functional groups decreases after heating. Therefore, the healable and recyclable polyimide polymer resin of the present disclosure is able to flow after heating, which facilitates processing, recycling or healing. The broken area thereof can be healed and sealed. Furthermore, in Table 8, the recovery ratios of Example 1, Example 3, Example 4, Example 6, Example 7, Example 9, Example 10 and Example 12 are all over 86%, which means that the tensile strength performance of the healable and recyclable polyimide polymer resin of the present disclosure after healed can be similar to that before being damaged.

Electrical Properties Test

In order to prove that the healable and recyclable polyimide polymer resin of the present disclosure can be applied to optoelectronic industry, semiconductor, circuit board, display, energy and other related fields and applications while maintaining the electrical properties thereof, the following test is performed.

First, a circuit containing silver is manufactured on the surface of the thin film of Example 2 by screen printing method. An electrical resistance of 105Ω is measured at two ends of the circuit by a multimeter. Then, the thin film is cracked to cut the circuit, and no electrical resistance is measured at the two ends of the circuit by the multimeter. Next, the thin film is healed by compression under 80°° C. to 150° C. (with a pressure of 200 PSI to 250 PSI), an electrical resistance of 101Ω is measured at the two ends of the circuit by the multimeter. Similar results can be obtained as testing the healable and recyclable polyimide polymer resin of other examples in the same way, which means that the electrical properties of the healable and recyclable polyimide polymer resin of the present disclosure after healed can be similar to that before being damaged.

Recycling Method of Healable and Recyclable Polyimide Polymer Resin and Properties of Recycled Polyimide Film In order to prove that the healable and recyclable polyimide polymer resin of the present disclosure still has great mechanical properties after being recycled, the healable and recyclable polyimide polymer resin is recycled into a recycled polyimide film by the recycling method of the present disclosure. The mechanical properties of the original healable and recyclable polyimide polymer resin and the recycled polyimide film are compared, and the comparing result is shown in Table 9 below.

TABLE 9

| | Tensile Strength (Mpa) | Elongation at Break (%) | Recovery Ratio |
|---|---|---|---|
| Recycled Polyimide Film | 130 | 3.9 | 92% |
| Original Healable and Recyclable Polyimide Polymer Resin | 141 | 4.6 | — |

The aforementioned recovery ratio is defined as "the tensile strength of the recycled polyimide film/the tensile strength of the original healable and recyclable polyimide polymer resin *100%". In Table 9, it shows that the recycled polyimide film made by the recycling method of the healable and recyclable polyimide polymer resin of the present disclosure can maintain similar mechanical properties to that before recycling.

In this regard, according to the present disclosure, the healable and recyclable polyimide polymer resin and the healing method thereof can have properties such as rigidity, chemical resistance and heat resistance due to the special chemical structure thereof, which gives wide applications in various fields. Moreover, because the fluidity thereof also increases as the healable and recyclable polyimide polymer resin is heated, the healable and recyclable polyimide polymer resin can be healed, recycled and further processed by controlling the temperature, so as to achieve the effect and goal of environmental friendly and reducing waste of resources.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A healing method of a healable and recyclable polyimide polymer resin, wherein the healable and recyclable polyimide polymer resin is healed by a healing process under a healing temperature;

wherein the healable and recyclable polyimide polymer resin comprises a chemical structural unit represented by formula (I):

formula (I)

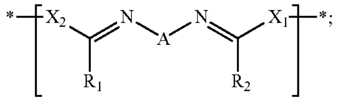

wherein in the formula (I), A is single bond, benzene, biphenyl, benzophenone or 3,3'-bis(trifluoromethyl)-4,4'-dimethylbiphenyl, each of $R_1$ and $R_2$ is methyl, ethyl or trifluoromethyl independently, $X_1$ is diphenyl ether, biphenyl, benzophenone, 2,2-diphenyl propane, (-)-di-p-toluenesulfonyl, or 3,3'-bis(trifluoromethyl)-4,4'-dimethylbiphenyl, $X_2$ is a group represented by formula (IA):

formula (IA)

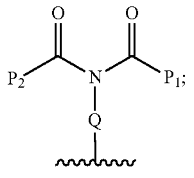

wherein in the formula (IA), Q is benzene, hexafluoro-2,2-diphenylmethane, biphenyl, benzophenone, diphenyl ether or alicyclic structure, each of $P_1$ and $P_2$ is benzene, biphenyl, hexafluoro-2,2-diphenylmethane or alicyclic structure independently, and $P_1$ and $P_2$ are connected to or disconnected from each other;

wherein the chemical structural unit represented by the formula (I) bonds to at least one condensation-polymerizable monomer, so as to form the healable and recyclable polyimide polymer resin, and the condensation-polymerizable monomer is a diamine monomer or a dianhydride monomer.

2. The healing method of the healable and recyclable polyimide polymer resin of claim 1, wherein the healing temperature is 80° C. to 150° C.

3. The healing method of the healable and recyclable polyimide polymer resin of claim 1, wherein the healing process is a heating healing process or a compressing healing process.

4. A recycling method of a healable and recyclable polyimide polymer resin, comprising:

performing a dissolving process, wherein the healable and recyclable polyimide polymer resin is dissolved in a solution of diethylenetriamine, so as to obtain a recycled polyimide solution; and performing a film-forming process, wherein the recycled polyimide solution is coated and baked, so as to form a recycled polyimide film;

wherein the healable and recyclable polyimide polymer resin comprises a chemical structural unit represented by formula (I):

formula (I)

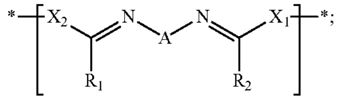

wherein in the formula (I), A is single bond, benzene, biphenyl, benzophenone or 3,3'-bis(trifluoromethyl)-4,4'-dimethylbiphenyl, each of $R_1$ and $R_2$ is methyl, ethyl or trifluoromethyl independently, $X_1$ is diphenyl ether, biphenyl, benzophenone, 2,2-diphenyl propane, (-)-di-p-toluenesulfonyl, or 3,3'-bis(trifluoromethyl)-4,4'-dimethylbiphenyl, $X_2$ is a group represented by formula (IA):

formula (IA)

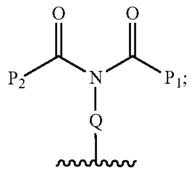

wherein in the formula (IA), Q is benzene, hexafluoro-2,2-diphenylmethane, biphenyl, benzophenone, diphenyl ether or alicyclic structure, each of $P_1$ and $P_2$ is benzene, biphenyl, hexafluoro-2,2-diphenylmethane or alicyclic structure independently, and $P_1$ and $P_2$ are connected to or disconnected from each other;

wherein the chemical structural unit represented by the formula (I) bonds to at least one condensation-polymerizable monomer, so as to form the healable and recyclable polyimide polymer resin, and the condensation-polymerizable monomer is a diamine monomer or a dianhydride monomer.

5. The recycling method of the healable and recyclable polyimide polymer resin of claim 4, wherein a solvent of the solution of diethylenetriamine is dimethylacetamide, and a percentage by volume of diethylenetriamine in the solution of diethylenetriamine is 1% to 10%.

6. The recycling method of the healable and recyclable polyimide polymer resin of claim 4, wherein a solid content of the recycled polyimide solution is 10% to 20%.

7. The recycling method of the healable and recyclable polyimide polymer resin of claim 4, wherein in the dissolving process, the healable and recyclable polyimide polymer resin is dissolved in the solution of diethylenetriamine under 25° C. to 80° C.

* * * * *